United States Patent [19]

Ogawa et al.

[11] 4,308,311
[45] Dec. 29, 1981

[54] MAGNETIC RECORDING MATERIAL

[75] Inventors: Hiroshi Ogawa; Masashi Aonuma; Yasuo Tamai, all of Odawara, Japan

[73] Assignee: Fuji Photo Film Co., Ltd., Minami-ashigara, Japan

[21] Appl. No.: 58,709

[22] Filed: Jul. 18, 1979

[30] Foreign Application Priority Data

Jul. 26, 1978 [JP] Japan ................................. 53/91179

[51] Int. Cl.³ ............................................. G11B 5/78
[52] U.S. Cl. ................................... 428/215; 360/134; 428/336; 428/337; 428/409; 428/474.7; 428/474.9; 428/475.8; 428/694; 428/695; 428/900
[58] Field of Search ................. 428/474.7, 474.9, 900, 428/475.5, 475.8, 694, 695, 336, 409, 337, 215; 427/131, 129; 360/131, 134, 135, 136

[56] References Cited

U.S. PATENT DOCUMENTS

| | | | |
|---|---|---|---|
| 3,903,351 | 9/1975 | Ando et al. | 428/474.4 |
| 4,112,187 | 9/1978 | Asakura et al. | 428/900 |
| 4,132,552 | 1/1979 | van Paesschen et al. | 427/129 |
| 4,141,774 | 2/1979 | Ando et al. | 428/475.5 |
| 4,163,826 | 8/1979 | Kamaguchi et al. | 428/475.5 |
| 4,183,976 | 1/1980 | Yamada et al. | 427/131 |

*Primary Examiner*—Stanley S. Silverman
*Attorney, Agent, or Firm*—Sughrue, Mion, Zinn, Macpeak and Seas

[57] ABSTRACT

A magnetic recording material, and, more particularly, a high density magnetic recording material is disclosed having an aromatic polyamide support in which the adhesion between the support and the magnetic recording layer is improved by an undercoating of an alcohol-soluble polyamide resin.

43 Claims, No Drawings

MAGNETIC RECORDING MATERIAL

BACKGROUND OF THE INVENTION

1. Field of the Invention

The present invention relates to a magnetic recording material and, more particularly, to a high density magnetic recording material having excellent adhesion between the support and the magnetic recording layer, and excellent running property. The present invention is useful in the fields of video tapes, flopp discs, and others.

2. Description of the Prior Art

High density magnetic recording materials, in particular audio cassette tapes or video cassette tapes, are restricted as to the length of tape by the size of the cassette half. In order to increase recording time the tape speed is slowed down and shorter wavelengths are used to record on the tape. There is a limit on the wavelengths which may be recorded on tapes, and the use of shorter wavelengths for recording on conventional magnetic recording materials has inevitably led to a reduction in sound or recording image quality.

Conventional magnetic recording materials comprise a magnetic recording layer and a non-magnetizable flexible support. The non-magnetizable flexible support usually has a thickness two times or more that of the magnetic recording layer, though it does not directly participate in magnetic recording. By reducing the thickness of the non-magnetizable flexible support it might be possible to record for longer periods of time using the same tape speed and the same cassette half or cartridge and record with the same sound or image quality. Thus, a reduction in thickness enables one to raise recording density per volume of magnetic recording tape. This approach is extremely practical due to the interchangeability between the thus recorded cassette tapes and conventional ones. However, when reduced in thickness, conventional non-magnetizable flexible supports suffer a reduction in tape stiffness and a deterioration in running property due to low Yound's modulus. Thus, it has been difficult to make the thickness of the tape thinner than the present level, e.g., 6 μm in Philip's type compact cassette tapes.

In recent years aromatic polyamide supports having higher Young's modulus than polyethylene terephthalate (hereinafter PET) which is a prominent non-magnetizable support have been proposed and described in Japanese Patent Application (OPI) Nos. 98897/74 (The term "OPI" as used herein refers to a "published unexamined Japaneses patent application"), 81880/76, 68660/76 and 129201/76 and U.S. Pat. No. 4,112,187, etc. These aromatic polyamide supports have a Young's modulus of not less than 1,500 kg/mm², which is two times or more that of PET (500 to 800 kg/mm²). Cassette tapes prepared using aromatic polyamide supports have poor adhesion between the support and the magnetic recording layer. Such adhesion is particularly poor in cassette tapes in which an isocyanate hardener is used as a part of the recording layer binder. As a result there is such a drop-out phenomenon that aromatic polyamide supports have not been put into practice. This may be due to the stronger hydrogen bond strength and the greater solubility parameter of aromatic polyamides than vinyl chloride resin, vinyl acetate resin, polyurethane resin, etc., generally used as a binder.

SUMMARY OF THE INVENTION

Accordingly, a primary object of the present invention is to provide a magnetic recording material having an aromatic polyamide support in which the adhesion between the aromatic polyamide support and the magnetic recording layer is improved by an alcohol-soluble polyamide resin layer.

Another object of the present invention is to provide a high density recording material having a reduced support thickness in which the support is an aromatic polyamide resin and adhesion between the support and the magnetic recording layer is improved by a layer of an alcohol-soluble polyamide resin.

Various investigations have led to the discovery that excellent adhesion between the support and the magnetic recording layer can be obtained using an alcohol-soluble polyamide resin as an undercoating for a magnetic recording layer on an aromatic polyamide support. That is, the present invention provides a magnetic recording material comprising a non-magnetizable flexible support of an aromatic polyamide resin having provided thereon a magnetic recording layer containing ferromagnetic fine powder dispersed in a binder, and an alcohol-soluble polyamide resin layer between the support and the magnetic recording layer.

DETAILED DESCRIPTION OF THE INVENTION

The aromatic polyamide resins used as the non-magnetizable flexible support in the present invention include polyamide resins represented by the general formulae (I) and (II):

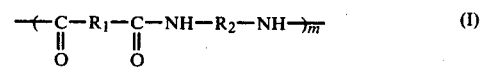 (I)

 (II)

wherein $R_1$, $R_2$ and $R_3$, each represents

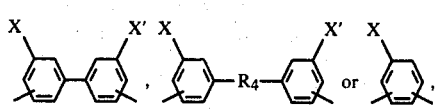

$R_4$ represents

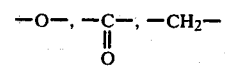

and $-SO_2-$, X and X' which may be the same or different each represents a hydrogen atom, a halogen atom (F, Cl and Br, preferably Cl) or a nitro group, and m and m' each is an integer of from about 100 to about 1,000, with the proviso that the polyamide resin contains at least 70% p-arylene groups (e.g., 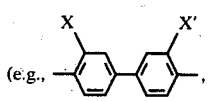

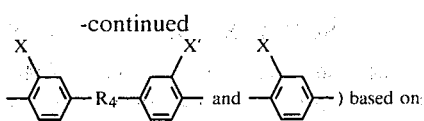

the total number of arylene groups in the resin. Of these, aromatic polyamide resins having at least 15% of p-arylene groups substituted with a halogen atom or a nitro group are preferred. Further, aromatic polyamide resins containing units of both the general formulae (I) and (II) in a molar ratio of (I) to (II) of from about 1:9 to about 9:1, preferably from about 1:4 to 4:1, can also be used in the present invention.

Examples of the aromatic polyamide resins include polyamide resins containing at least 70% based on the total number of arylene units in the resin of one or more of a unit selected from the group consisting of a terephthalhydrazide unit, a p-benzamide unit and a p-phenyleneterephthalamide unit. A p-phenyleneterephthalamide unit has a high molecular rigidity and high symmetry and hence the resulting support has a high Young's modulus. The aromatic polyamide resins having the structures represented by

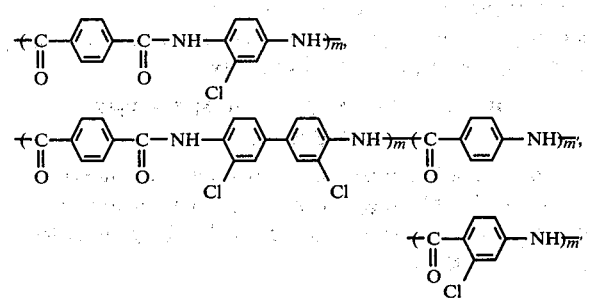

or the like are particularly preferred.

The weight average molecular weight of the aromatic polyamide resin ranges from about 10,000 to 100,000, particularly from about 30,000 to 50,000. If the molecular weight is less than about 10,000, the Young's modulus is too low, while if it is more than about 100,000, moldability and workability are too poor.

The aromatic polyamide resins can be produced by polymerization or condensation of aromatic diamines such as p-phenylenediamine, m-phenylenediamine, o-phenylenediamine, 2-nitro-p-phenylenediamine, 2-chloro-p-phenylenediamine, benzidine, 3,3'-chlorobenzidine, etc., with aromatic dicarboxylic acids such as terephthalic acid chloride, 2-chloroterephthalic acid chloride, terephthalic acid hydrazide, p-aminobenzoic acid hydrazide, p-aminobenzoic acid chloride. The aromatic polyamide resins are molded into a film by melt-molding or solution-molding using a solvent such as dimethylacetamide, dimethylformamide, N-methylpyrrolidone, hexamethyl phosphoroamide, γ-butyrolactone, tetramethylurea, dioxane or a mixture thereof, or those further containing as a neutralization product of the polymerization solution an inorganic salt such as lithium chloride, calcium chloride, lithium carbonate, lithium nitrate, etc.

For instance, a polyamide support can be prepared in the following manner.

Terephthalic acid hydrazide, p-aminobenzoic acid hydrazide, p-phenylenediamine, p-aminobenzoyl chloride and terephthaloyl chloride are properly combined, and a 5 wt% solution of polyamide resin comprising 33 mol% of terephthalhydrazide, 33 mol% of p-benzamide, and 33 mol% of p-phenyleneterephthalamide is obtained by low temperature (about 10° to 35° C.) solution polymerization process. The solvent used for the solution polymerization is preferably dimethylacetamide and calcium chloride is contained in the polymerization solution as a neutralization product. This solution is cast on a metallic belt and dried until the polymer concentration becomes about 30 wt% by heating at about 100° C. for 5 minutes. The film is then dipped for about 2 minutes in water at normal temperatures (about 10° to 35° C.) to remove the solvent and calcium chloride. After further washing with water and drying at 230° C., the resulting film is rolled up. Orientation is conducted by stretching the dried film in the longitudinal direction in a 50° C. dimethylacetamide aqueous solution through the difference in rotating speeds of associated nip rolls, and subsequently stretching it in a lateral direction by guiding it to a tenter and expanding the rail distance. The draw ratio is generally kept from about 1.1 to 2.0 times in both longitudinal and lateral directions. Thus, a 3 μm thick aromatic polyamide film is obtained.

The thickness of the support obtained by melt-molding or solution-molding the aromatic polyamide is about 2 to 80 μm, particularly preferably about 3 to 10 μm. The surface roughness of the support is preferably not more than about 0.1 μm in terms of maximum height of irregularities (measured in accordance with JIS B 0601 (1976) and ASA B46-1 (1962)), since such surface roughness serves to minimize the noise.

The alcohol-soluble polyamide resin used in the present invention as an undercoating is a polyamide copolymer (copolyamide) or a nylon copolymer prepared by copolymerizing two or more and preferably three or more combinations of materials (monomers) which are used to produce homonylons. In other words, the polyamide resins are, for example, prepared from more than one combination of amino acid, lactam or dicarboxylic acid and diamine. The term "homonylon" as used herein refers to a polyamide prepared from only one combination.

As the materials for preparing the copolyamides, dicarboxylic acids and acid anhydrides thereof, diamines, lactams, amino acids, etc., are generally used.

The dicarboxylic acids and acid anhydrides thereof include aliphatic or aromatic acids or acid anhydrides and especially those represented by the general formulae (III) and (IV):

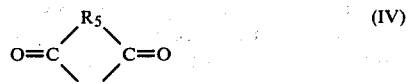

wherein R$_5$ represents an alkylene group having 2 to 8 carbon atoms (such as ethylene, trimethylene, tetramethylene, etc.), a cycloalkylene group having 5 to 8 carbon atoms (such as cyclohexylene, etc.), phenylene and naphthylene; and are exemplified by succinic acid, glutaric acid, adipic acid, pimelic acid, suberic acid, azelaic acid, sebacic acid, phthalic acid, isophthalic acid, terephthalic acid, phthalic anhydride, etc. In addition, ammonium salts, alkali metal salts (Na, K, etc.), or the like of these dicarboxylic acids can be used.

The diamines include aliphatic or aromatic diamines represented by the general formula (V):

$$H_2N\text{-}(R_6)_n\text{-}NH_2 \qquad (V)$$

wherein $R_6$ represents an alkylene group, which may contain cycloalkylene groups in its chain, having 1 to 15 carbon atoms (such as ethylene, trimethylene, tetramethylene, pentamethylene, hexamethylene, heptamethylene, octamethylene, nonamethylene, decamethylene, undecamethylene, dodecamethylene, tridecamethylene, etc.), a cycloalkylene group having 5 to 8 carbon atoms (such as cyclohexylene), phenylene, biphenyl, tolylene, xylylene and naphthylene, n is 0 or 1. Representative diamines include hydrazine, methylenediamine, ethylenediamine, trimethylenediamine, tetramethylenediamine, pentamethylenediamine, hexamethylenediamine, heptamethylenediamine, octamethylenediamine, nonamethylenediamine, decamethylenediamine, diaminocyclohexane, di(aminomethyl)cyclohexane, bis(4-aminocyclohexyl)methane, bis(4-amino-3,5-methylcyclohexyl)methane, o-phenylenediamine, m-phenylenediamine, p-phenylenediamine, 4,4'-diaminobiphenyl, tolylenediamine, xylylenediamine, naphthylenediamine, etc.

The lactams which can be used in forming the polyamide include those represented by the general formula (VI):

$$R_7 \diagdown \begin{matrix} NH \\ | \\ C=O \end{matrix} \qquad (VI)$$

wherein $R_7$ represents an alkylene group having 3 to 11 carbon atoms such as tetramethylene, pentamethylene, hexamethylene, heptamethylene, octamethylene, nonamethylene, decamethylene, undecamethylene, etc.; and are exemplified by 2-pyrrolidone, α-piperidone, δ-caprolactam, ω-enantholactam, ω-capryllactam, ω-laurolactam, etc.

The amino acids (aminocarboxylic acids) include those represented by the general formula (VII):

$$H_2N\text{-}R_8\text{-}\underset{\underset{O}{\|}}{C}\text{-}OH \qquad (VII)$$

wherein $R_8$ represents an alkylene group having 3 to 11 carbon atoms such as tetramethylene, pentamethylene, hexamethylene, heptamethylene, octamethylene, nonamethylene, decamethylene, undecamethylene, etc.; and are exemplified by γ-aminobutanoic acid, ε-aminohexanoic acid, ω-aminoheptanoic acid, ω-aminooctanoic acid, ω-aminodecanoic acid, ω-aminoundecanoic acid, ω-aminododecanoic acid, etc.

Of the above-described materials, particularly preferable materials are dicarboxylic acids such as adipic acid, sebacic acid, etc., diamines such as hexamethylenediamine, ethylenediamine, etc., lactams such as ε-caprolactam, ω-laurolactam, etc., and amino acids such as 11-aminoundecanoic acid, glutamic acid, etc.

Of nylon copolymers produced by copolymerizing two or more combinations of acid, diamine, lactam, etc., 6,6/6,6/10-nylon terpolymer, 6,6/6,6,bis(4-aminocyclohexyl)methane-6-nylon terpolymer, etc., are particularly preferable as the undercoating of the present invention. These nylon copolymers are described in detail in Vieweg and Müller, Polyamide, (1966, published by Carl Hamser Co.).

As the alcohol-soluble polyamide resins used in the present invention, N-alkoxymethyl-modified nylons (N-polymethylene oxide-modified nylons) can be used as well as the above-described nylon copolymers. "N-alkoxymethyl-modified nylons" are prepared by reacting nylon with formalin and alcohol, and have the molecular structure represented by the formula (VIII):

$$\begin{matrix} -NCO- \\ | \\ (CH_2O)_pR_9 \end{matrix} \qquad (VIII)$$

wherein $R_9$ represents a hydrogen atom and an alkyl group having 1 to 5 carbon atoms such as methyl, ethyl, propyl, butyl, amyl, etc., preferably methyl and ethyl, and p is an integer of about 1 to about 50, preferably 1 to 10. The modification degree of the nylon is more than 20%, preferably more than 30%, based on the total number of repeating units in the nylon.

These N-alkoxymethyl-modified nylons are described in U.S. Pat. No. 2,430,860, etc.

The alcohol-soluble polyamide resins used in the present invention as an undercoating preferably have a polymerization degree of from about 250 to about 400, and a weight average molecular weight of from about 10,000 to about 100,000, particularly preferably from 30,000 to 50,000.

Synthesis of the aromatic polyamide resins and the alcohol-soluble polyamide resins is described in Lecture on Plastic Materials (16), Polyamide Resins, compiled by Osamu Fukumoto, July 25, 1970, Nikkan Kogyo Shinbun Co.; Synthetic High Polymers V, compiled by Murahashi and Imoto, pp. 11–186, June 15, 1971, Asakura Shoten; U.S. Pat. Nos. 2,130,497, 2,130,523, 2,149,273, 2,158,064, 2,223,493, 2,249,627, 2,534,347, 2,540,352, 2,715,620, 2,756,221, 2,939,862, 2,994,693, 3,012,994, 3,133,956, 3,188,228, 3,193,475, 3,193,483, 3,197,443, 3,226,362, 3,242,134, 3,247,167, 3,299,009, 3,328,352, 3,354,123, etc.

Examples of the synthesis of alcohol-soluble polyamide resins are provided in the following synthesis examples wherein all parts are by weight.

SYNTHESIS EXAMPLE 1

6,6/6,6/10-Nylon Terpolymer 1 part of ε-caprolactam, 1 part of hexamethylenediammonium salt of adipic acid, 1 part of hexamethylenediammonium salt of sebacic acid, and 0.01 part of acetic acid were fed to an autoclave. After raising the solution temperature to 200° to 220° C. and the pressure to 15 to 20 kg/cm², the temperature of the reaction mixture was further increased to 265° to 270° C. while reducing the pressure. Finally, steam was gradually withdrawn and, after maintaining the reaction mixture at an ordinary or reduced pressure for several ten minutes, the polymer was removed and cooled to obtain 6,6/6,6/10-nylon terpolymer.

SYNTHESIS EXAMPLE 2

N-Alkoxy-Modified Nylon Terpolymer

To 4.7 parts of a 20% by weight 6/6-nylon formic acid solution were added, at 60° C., 1 part of paraformaldehyde, 1.33 parts of methanol and 0.0006 part of sodium hydroxide and maintained at 60° C. for 30 minutes. Then, the reaction solution was poured into a mixture of 9 parts acetone and 11 parts water, followed by adding thereto concentrated aqueous ammonia to make the solution neutral or alkaline. After vigorously stirring the system at 30° C. for 1 hour, N-methoxy-modified 6/6-nylon precipitate was collected by filtration.

This reaction is illustrated by the following equation:

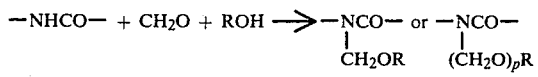

In addition to the above, several nylons which can be used in the present invention are commercially available such as 12-nylon is available as Diamide X-1874 (made by Daicel Ltd.), 6,6/6,bis(4-aminocyclohexyl)methane-6-nylon is available as Ultramide 1C (made by BASF A.G.), etc.

The alcohol-soluble polyamide resin is coated on a non-magnetizable aromatic polyamide flexible support and dried followed by coating thereon a magnetic recording layer and drying it. In order to improve the effects of the present invention, it is preferable to subject the magnetic recording layer to heat-treatment at about 40° C. to 60° C. under about 50% RH, preferably about 20% RH to 40% RH, and store for 1 to 4 weeks to conduct aging.

The solvent used to coat the alcohol-soluble polyamide resin undercoating of the present invention on a non-magnetizable and flexible aromatic polyamide support may be an alcohol having 1 to 5 carbon atoms. Specifically methanol, ethanol, isopropanol, butanol, pentanol, etc., are preferred. They may be used in mixture. Alcohols containing 6 or more carbon atoms are not preferred since their high boiling points decrease the drying rate of the undercoating layer. The combined use of the above alcohols with a chlorine-series solvent such as chloroform, trichloroethylene, ethylene dichloride, etc., is more preferred. The amount of the chlorine-series solvent ranges from 0 to about 50% by weight, preferably 0 to 30% by weight, based on the total weight of the solvent used.

The dry thickness of the undercoating layer is about 0.03 to 0.3 $\mu$m, preferably about 0.05 to 0.2 $\mu$m. If it is less than 0.03 $\mu$m, the effects of the undercoating are not obtained, whereas if it is more than 0.3 $\mu$m, a smooth surface is difficult to obtain. Thus, such thickness is not preferred.

The magnetic recording layer used in the present invention is prepared by coating on the above-described undercoating layer of the present invention a magnetic coating composition (containing a ferromagnetic powder kneaded and dispersed in a binder, additive, solvent, etc.), orienting the magnetic particles and drying to provide a coating-type magnetic recording layer.

Detailed descriptions of processes for preparing the magnetic coating compositions are given in Japanese Pat. Nos. 15/60, 26794/64, 186/68, 28043/72, 28045/72, 28046/72, 28048/72, 31445/72, 11162/73, 21331/73, 33683/73, U.S.S.R. Pat. No. 308,033 (S. I. Omelchenko et al), U.S. Pat. Nos. 2,581,414, 2,855,156, 3,240,621, 3,526,598, 3,728,262, 3,790,407, 3,836,393, etc. Magnetic coating materials described in these references contain a ferromagnetic fine powder, a binder and a coating solvent as essential components and, in some cases, they further contain a dispersing agent, a lubricant, an abrasive, an antistatic agent, etc.

As the above-described ferromagnetic fine powder, ferromagnetic iron oxide, ferromagnetic chromium dioxide, ferromagnetic alloy dust, etc., can be used. Above-described ferromagnetic iron oxide includes those represented by the general formula $FeO_x$ wherein x is in the range of 1.33 to 1.50, i.e., maghemite ($\gamma$-$Fe_2O_3$, x=1.50), magnetite ($Fe_3O_4$, x=1.33), and Berthollide compounds thereof ($FeO_x$, 1.33 to 1.50). The above-described x value is determined according to the following equation:

$$x = \frac{1}{200} \times \left\{ 2 \times \binom{\text{atomic \%}}{\text{of Fe(II)}} + 3 \times \binom{\text{atomic \%}}{\text{of Fe(III)}} \right\}$$

Divalent metals may be added to these ferromagnetic iron oxides such as Cr, Mn, Co, Ni, Cu, Zn, etc., which are added to the above-described iron oxide in an amount of about 0 to 10 atomic %.

As above-described ferromagnetic chromium dioxide, there are used $CrO_2$ and $CrO_2$ modified with other metals such as Li, Na, K, Be, Mg, Al, Ti, V, Mn, Fe, Co, Ni, Cu, Zn, Ga, Ge, Zr, Nb, Tc, Ru, In, Sn, Ce, Pt, Pb, etc., semi-conductors such as P, As, Se, Sb, Te, etc., or the oxides of these metals in an amount of about 0 to 20 wt%.

The ferromagnetic iron oxide and ferromagnetic chromium dichloride having the axial ratio of about 2/1 to 20/1, preferably not less than about 5/1 and the average length of about 0.2 to 2.0 $\mu$m are effectively used in the present invention.

The above-described ferromagnetic alloy powder contains not less than about 75 wt% metal component, with about 80 wt% or more of the metal component being at least one ferromagnetic metal (i.e., Fe, Co, Ni, Fe-Co, Fe-Ni, Co-Ni, or Co-Ni-Fe) and 20 wt% or less, preferably 0.5 to 5 wt%, of the metal component being Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc. In some cases, it contains a slight amount of water, hydroxide, or oxide.

This ferromagnetic alloy powder is of particles having a length of not more than about 0.5 $\mu$m.

It is preferable to use the above-described ferromagnetic powder for the magnetic recording material of the present invention. Specific descriptions thereof are given in Japanese Pat. Nos. 5515/61, 4825/62, 5009/64, 10307/64, 14090/69, 18372/70, 22062/72, 22513/72, 28466/71, 38755/71, 4286/72, 12422/72, 17284/72, 18509/72, 18573/72, 39639/73, U.S. Pat. Nos. 3,026,215, 3,031,341, 3,100,194, 3,242,005, 3,389,014, British Pat. Nos. 752,659, 782,762, 1,007,323, French Pat. No. 1,107,654, West German patent application (OLS) No. 1,281,334, etc.

As the binder for the magnetic recording layer, conventionally known thermoplastic resins, thermosetting resins, reaction type resins, or mixtures thereof may be used.

As the thermoplastic resins, those resins which have a softening point of not higher than 150° C., a mean molecular weight of 10,000 to 200,000, and a polymerization degree of about 200 to 2,000, such as vinyl chloride/vinyl acetate copolymer, vinyl chloride/vinylidene chloride copolymer, vinyl chloride/acrylonitrile copolymer, acrylic ester/acrylonitrile copolymer, acrylic ester/vinylidene chloride copolymer, acrylic ester/styrene copolymer, methacrylic ester/acrylonitrile copolymer, methacrylic ester/vinylidene chloride copolymer, methacrylic ester/styrene copolymer, urethane elastomer, polyvinyl fluoride, vinylidene chloride/acrylonitrile copolymer, butadiene/acrylonitrile copolymer, polyamide, resin, polyvinyl butyral, cellulose derivatives (e.g., cellulose acetate butyrate, cellulose diacetate, cellulose triacetate, cellulose propionate, nitrocellulose, etc.), styrene/butadiene copolymer, linear polyester resin, various thermoplastic resins of synthetic rubber series (such as polybutadiene, polychloroprene, polyisoprene, styrene/butadiene copolymer, etc.), mixtures thereof, etc., are suitable. These results are illustrated in Japanese Pat. Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, 27886/73, U.S. Pat. Nos. 3,144,352, 3,419,420, 3,499,789, 3,713,887, etc.

Of these thermoplastic resins, vinyl chloride/vinyl acetate copolymer, vinyl chloride/vinylidene chloride copolymer, urethane elastomer, butadiene/acrylonitrile copolymer and cellulose derivatives are particularly preferred in the present invention.

The thermosetting resins or reaction-type resins having a molecular weight of not more than 200,000 in the coating solution and, after coating and drying, the molecular weight becomes infinite upon condensation, addition, etc., are also suitable as a binder. Of such resins, those which do not soften or dissolve before thermal decomposition are preferred. Specific examples thereof include, for example, phenol-formalin novolak resin, phenol-formalin resol resin, phenol-furfural resin, xylene-formaldehyde resin, urea resin, melamine resin, drying oil-modified alkyd resin, carbolic acid resin-modified alkyd resin, maleic acid resin-modified alkyd resin, unsaturated polyester resin, epoxy resin and hardener (polyamine, acid anhydride, polyamide, resin, etc.), isocyanato-terminated polyester moisture-setting resin, isocyanato-terminated polyether moisture-setting resin, polyisocyanate prepolymer (compound containing three or more isocyanto groups, obtained by reacting a diisocyanate with a low molecular weight triol, diisocyanate trimer and tetramer), resin containing polyisocyanate prepolymer and active hydrogen (polyester polyol, polyether polyol, acrylic acid copolymer, maleic acid copolymer, 2-hydroxyethyl methacrylate copolymer, p-hydroxystyrene copolymer, etc.), the mixtures thereof, etc. These resins are illustrated in Japanese Pat. Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, 28922/72, U.S. Pat. Nos. 3,144,353, 3,320,090, 3,437,510, 3,597,273, 3,781,210, 3,781,211, etc.

Of these thermosetting resins or reaction-type resins, modified alkyd resins, epoxy resins, isocyanateterminated resins, polyisocyanate prepolymer and the mixture thereof are preferably used in the present invention These binders are used alone or in combination, and additives may be added thereto. The mixing ratio of the ferromagnetic powder to the binder is about 8 to 400 parts by weight, preferably about 10 to 200 parts by weight, of the binder per 100 parts by weight of the ferromagnetic powder. To the magnetic recording layer may be added a dispersing agent, lubricant, abrasive, antistatic agent, etc., as additives in addition to the above-described binder and ferromagnetic powder.

As the dispersing agent, fatty acids containing 12 to 18 carbon atoms ($R_{10}COOH$ wherein $R_{10}$ represents an alkyl or alkenyl group containing 11 to 17 carbon atoms) such as caprilic acid, capric acid, lauric acid, myristic acid, palmitic acid, stearic acid, oleic acid, elaidic acid, linoleic acid, linolenic acid, stearolic acid, et.; alkali metal (Li, Na, K, etc.) salts of these fatty acids; metallic soaps of alkaline earth metal (Mg, Ca, Ba) salts of these fatty acids; fluorine-containing ester compounds of said fatty acids; amides of these fatty acids; polyalkylene oxide alkyl phosphates; lecithin; trialkylpolyolefinoxy quaternary ammonium salts (alkyl moiety containing 1 to 5 carbon atoms, and olefin being ethylene, propylene, etc.); etc., may be used. In addition, higher alcohols containing 12 or more carbon atoms, sulfuric esters, etc., are also suitable. These dispersing agents are added in an amount of about 0.5 to 20 parts by weight per 100 parts by weight of the binder and are described in Japanese Pat. Nos. 28369/64, 17945/69, 7441/73, 15001/73, 15002/73, 16363/73, 4121/75, U.S. Pat. Nos. 3,387,993, 3,470,021, etc.

As the lubricant, silicone oils such as dialkylpolysiloxane (alkyl moiety containing 1 to 5 carbon atoms), dialkoxypolysiloxane (alkoxy moiety containing 1 to 4 carbon atoms), monoalkylmonoalkoxypolysiloxane (alkyl moiety containing 1 to 5 carbon atoms, and alkoxy moiety containing 1 to 4 carbon atoms), phenylpolysiloxane, fluoroalkylpolysiloxane (alkyl moiety containing 1 to 5 carbon atoms), etc.; conductive fine dust of graphite, etc.; inorganic fine dust of molybdenum disulfide, tungsten disulfide, etc.; plastic fine dust of polyethylene, polypropylene, ethylene/vinyl chloride copolymer, polytetrafluoroethylene, etc.; $\alpha$-olefin condensates; unsaturated aliphatic hydrocarbons which are in a liquid state at ordinary temperature (compounds wherein n-olefinic double bond is bound to a terminal carbon atom, and which contains about 20 carbon atoms); fatty acid esters derived from monobasic fatty acid containing 12 to 20 carbon atoms and monovalent alcohol containing 3 to 12 carbon atoms; fluorocarbons; etc., can be used. These lubricants are added in an amount of about 0.2 to 20 parts by weight per 100 parts by weight of the binder. They are described in Japanese Pat. Nos. 29709/59, 11033/63, 23889/68, 40461/71, 15621/72, 18482/72, 28043/72, 30207/72, 32001/72, 7442/73, 14247/74, 5042/75, 14082/77, 18561/77, 8804/77, 49803/77, 49804/77, 49805/77, 67304/77, 70811/77, U.S. Pat. Nos. 2,654,681, 3,470,021, 3,492,235, 3,497,411, 3,523,086, 3,625,760, 3,630,772, 3,634,253, 3,642,539, 3,687,725, 3,996,407, 4,007,313, 4,007,314, 4,018,967, 4,018,968, *IBM Technical Disclosure Bulletin*, Vol. 9, No. 7, p. 779 (1966, 12), *ELECTRONIK*, 1961, No. 12, p. 380, etc.

As the abrasive, materials such as fused alumina, silicon carbide, chromium oxide ($Cr_2O_3$), corundum, artificial corundum, diamond, artificial diamond, garnet, emery (major components: corundum and magnetite), etc., are used ordinarily. These abrasives have a Mohs' hardness of about 5 or more, and they are used in the average particle size of about 0.05 to 5$\mu$, particularly preferably 0.1 to 2$\mu$. These abrasives are added in an amount of about 0.5 to 20 parts by weight per 100 parts by weight of the binder. They are described in Japanese Pat. Nos. 18572/72, 15003/73, 15004/73 (U.S. Pat. Nos. 3,617,378), 39402/64, 9401/75, U.S. Pat. Nos. 3,007,807, 3,041,196, 3,293,066, 3,630,910, 3,687,725, 4,015,042, British Pat. Nos. 1,145,349, DT-PS 853,211, 1,101,000, etc.

As the antistatic agents, conductive fine dust of carbon black, carbon black graft polymer, etc.; natural surfactants like saponin; nonionic surfactants such as alkylene oxide series, glycerin series or glycidol series surfactants; cartionic surfactants such as higher alkylamines, quaternary ammonium salts, hetero ring compounds like pyridine, phosphonium or sulfonium compounds, etc.; anionic surfactants containing acidic groups such as carboxylic acids, sulfonic acids, phosphoric acids, sulfuric acid ester groups, phosphoric ester groups, etc., and amphoteric surfactants such as amino acids, aminosulfonic acids, amino-alcohol sulfuric or phosphoric esters, etc., can be used. These conductive fine dusts may be added to the magnetic composition in an amount of about 0.2 to 20 parts by weight, and the surfactants in an amount of about 0.1 to 10 parts by weight, per 100 parts by weight of the binder.

Several examples of the conductive fine dusts and the surfactant compounds used as the antistatic agents are described in Japanese Pat. Nos. 22726/71, 24881/72, 26882/72, 15440/73, 26761/73, Japanese patent application (OPI) Nos. 18561/77, 38201/77, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German patent application (OLS) No. 1,942,665, British Pat. Nos. 1,077,317, 1,198,450, and books such as Ryohei Oda et al, *Synthesis and Application of Surface Active Agents,* (Maki Shoten, 1964), A. M. Schwarz & J. W. Perry, *Surface Active Agents* (Interscience Publication Inc., 1958), J. P. Sisley, *Encyclopedia of Surface Active Agents,* Vol. 2 (Chemical Publish Co., 1964), Handbook of Surface Active Agents, 6th Ed. (Sangyo Tosho K. K., Dec., 20, 1966), etc. These surfactants may be added alone or in combination. These are generally relied on antistatic agents but, in some cases, they may be used for other purposes, for example, to improve dispersing and magnetic properties, to improve libricating properties, or as coating aids.

The organic solvent used as the coating solvent for the magnetic coating composition can be selected from among ketones (e.g., acetone, methyl ethyl ketone, methyl isobutyl ketone, cyclohexanone, etc.), alcohols (e.g., methanol, ethanol, propanol, butanol, etc.), esters (e.g., methyl acetate, ethyl acetate, butyl acetate, ethyl lactate, glycol acetate monoethyl ether, etc., ethers, glycol ethers (glycol dimethyl ether, glycol monomethyl ether, dioxane, etc.), tar compounds (aromatic hydrocarbons) (e.g., benzene, toluene, xylene, etc.), chlorinated hydrocarbons (e.g., methylene chloride, ethylene chloride, carbon tetrachloride, chloroform, ethylene chlorohydrin, dichlorobenzene, etc.), and the like.

The magnetic powder, binder, dispersing agent, lubricant, abrasive, antistatic agent, solvent, etc., are kneaded to prepare a magnetic coating material.

Upon kneading, the magnetic powder and the respective ingredients described above are thrown into a kneader at the same time or one after one another. In addition, the magnetic powder may be added to the solvent containing the dispersing agent and kneading continued for a predetermined time to prepare the magnetic coating material.

In kneading and dispersing to prepare the magnetic coating material, various kneading machines may be used, e.g., a twin roll mill, triple roll mill, ball mill, pebble mill, tron mill, sand grinder, Szegvari attritor, high speed impeller dispersing machine, high speed stone mill, high speed impact mill, disper, kneader, high speed mixer, homogenizer, ultrasonic wave dispersing machine, etc. Kneading and dispersing techniques are described in T. C. Patton, *Paint Flow and Pigment Dispersion* (1964, John Wiley & Sons Co.), U.S. Pat. Nos. 2,581,414 and 2,855,156.

Air-doctor coating, blade coating, air knife coating, squeeze coating, dip coating, reverse roll coating, transfer roll coating, gravure coating, kiss coating, cast coating, spray coating, spin coating, etc., for coating the aforesaid magnetic recording layer on a support can be utilized. Other methods are also employable. Specific descriptions of these methods are given in *Coating Engineering,* pp. 253–277 (Mar. 20, 1971, Asakura Shoten).

With respect to two-layer magnetic recording materials, a magnetic recording layer is coated on a nonmagnetizable support according to the above-described coating method, and dried. This step is repeated continuously to provide two-layer magnetic recording layer. In addition, two-layer magnetic recording layer may be provided according to a method of coating multilayers at the same time as described in Japanese patent application (OPI) Nos. 98803/73 DT-OS 2,309,159), 99233/73 (DT-AS 2,309,158), etc.

The magnetic recording layer is coated so that the dry thickness thereof becomes about 0.8 to 10 $\mu$m, preferably 1 to 5 $\mu$m. If the thickness is less than 0.8 $\mu$m, it is difficult to coat in a uniform thickness, whereas if more than 10 $\mu$m, thickness of the total tape becomes too thick. Thus, such thickness is not preferred. In the case of coating two layers, sum of the thickness of respective layers be within the above-described range. This dry thickness be decided according to the end-use, form, standard, etc., of the magnetic recording material.

The magnetic recording layer thus coated on the support is subjected, if necessary, to the aforesaid treatment of orienting the magnetic powder in the layer, and dried. If necessary, the thus prepared material is subjected to surface-smoothing treatment or is cut into desired shape to produce magnetic recording material of the present invention.

In the present invention, it has been found that surface-smoothing treatment of the magnetic recording layer serves to provide a magnetic recording material having a smooth surface and an excellent abrasion resistance. This surface-smoothing treatment is conducted by smoothing treatment before drying, or by calendering treatment after drying.

The ferromagnetic powders may be oriented in the following manner. Orienting magnetic filed is about 500 to 3,000 Oe and produced by either alternating (A.C.) or direct (D.C.) electric current. The orienting direction of the magnetic material depends upon the end-use thereof. That is, in the case of sound tapes, small-sized video tapes, memory tapes, etc., magnetic powder is oriented in the parallel direction to the longitudinal direction of the tape, whereas video tapes for use in broadcasting are oriented with an angle of 30° to 90° with respect to the longitudinal direction.

Methods for orienting magnetic powders are also described in the following patents: for example, U.S. Pat. Nos. 1,949,840, 2,796,359, 3,001,891, 3,172,776, 3,416,949, 3,473,960, 3,681,138, Japanese Pat. Nos. 3427/57, 28368/64, 23624/65, 23625/65, 13181/66, 13043/73, 39722/73, etc. As is described in Japanese patent application (OPI) No. 79905/77, U.S. Pat. Nos. 3,775,178, and DT-AS 1,190,985, it is possible to orient an upper layer and a lower layer of two-layer magnetic layer in different directions.

Temperatures for drying oriented magnetic recording layer range from about 50° to about 120° C., preferably 70° to 100° C., particularly preferably 80° to 90° C., rate of air flow is 1 to 5 kl/m², preferably 2 to 3 kl/m², and drying time ranges from about 30 seconds to about 10 minutes, preferably 1 to 5 minutes.

As the coating surface-smoothing treatment to be conducted before drying the magnetic recording layer, magnet smoother, smoothing coil, smoothing blade, smoothing blanket, etc., are properly selected and used. These are described in Japanese Pat. No. 38802/72, British Pat. No. 1,191,424, Japanese Pat. No. 11336/73, Japanese patent application (OPI) Nos. 53631/74, 112005/75, 77303/76, etc.

Calendering treatment of the coating surface after drying the magnetic recording layer be preferably coated according to a super-calendering method of passing between two rolls, for example, between a metal roll and a cotton roll or synthetic resin roll (made of, for example, nylon, polyurethane, etc.), or between metal rolls. Preferable supercalendering conditions are about 25 to 50 kg/cm in inter roll pressure, about 35° to 150° C. in temperature, and 5 to 200 m/min in treating velocity. Temperature and pressure exceeding the above-described upper limits would exert detrimental influences on the magnetic recording layer and the non-magnetizable support. If the treating velocity is less than about 5 m/min, surface-smoothing effect cannot be obtained, whereas if more than 200 m/min, treating procedure becomes difficult.

Such surface-smoothing treatment is described in U.S. Pat. Nos. 2,688,567, 2,998,325, 3,783,023, West Geramn patent application (OLS) No. 2,405,222, Japanese patent application (OPI) Nos. 53631/74, 10337/75, 99506/75, 92606/76, 102049/76, 103404/76, Japanese Pat. No. 17404/77, etc.

The opposite side of the support to the magnetic recording layer-coated side may be back-coated for the purpose of preventing electrostatic charge, preventing print through phenomenon, preventing wow flutter, improving strength of the magnetic recording material, matting the back side, or the like. This back-coating layer is provided by coating a coating solution prepared by kneading and dispersing at least one additive selected from among the aforesaid lubricants, abrasives, antistatic agents, etc., and, if necessary, dispersing agents for uniformly dispersing the abovedescribed additives in the aforesaid binder and the coating solvent, on the back side of the support, followed by drying. The order of providing the aforesaid magnetic recording layer and the back-coating layer is optional. Preferable additives ordinarily used include inorganic additives such as carbon black, graphite, talc, $Cr_2O_3$, $\alpha$—$Fe_2O_3$ (red iron oxide), and organic additives such as silicone oil, etc. As the binder, thermosetting resins or reaction-type resins selected from the foregoing binders are preferred. A particularly preferable composition comprises a binder mainly containing polyurethane resin having dispersed therein carbon black. Undercoating of the alcohol-soluble polyamide resin of the present invention may also be provided between such back-coating layer and the support so as to attain an excellent adhesion therebetween. Inorganic additives are added in an amount of about 30 to 85 wt%, preferably 40 to 80%, based on the total solid ingredients of the back-coating layer, whereas organic additives are added in an amount of about 0.1 to 30 wt%, preferably 0.2 to 20 wt%. Dry thickness of the back-coating layer is in the range of from about 0.5 to 3 μm, preferably 1 to 2 μm, which may optionally be selected depending upon the total thickness, end-use, shape, purpose, etc., of the magnetic recording material.

Back-coating layer is described in, for example, Japanese Pat. Nos. 13411/77, 17401/77, Japanese patent application (OPI) Nos. 150407/75, 8005/77, 8006/77, 17003/77, 25603/77, 30403/77, 37405/77, 40303/77, 40304/77, Japanese Utility Model Pat. Nos. 6268/77, 8419/77, Japanese Utility Model application (OPI) Nos. 13411/77, 17401/77, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688, 3,761,311, etc.

The present invention will now be described in more detail by the following examples and comparative examples, however, these examples should not be construed as limiting since as will be understood by those skilled in the art the ingredients, proportions, procedures, orders, and the like to be described hereinafter can be modified within the spirit of the present invention. Additionally, in the following examples and comparative examples all parts are by weight.

The present invention is applicable to video tapes, floppy discs and the like.

EXAMPLE 1

| Magnetic Coating Material A | parts |
|---|---|
| $\gamma$-$Fe_2O_3$(Hc: 400 Oe; average particle length: 0.5 μm; axial ratio: 10/1) | 300 |
| Vinyl chloride/vinyl acetate/vinyl alcohol copolymer (copolymerization ratio: 92/3/5 (by weight); polymerization degree: 420) | 56 |
| Polyester polyurethane (synthesized from butylene adipate and diphenylmethane-diisocyanate; molecular weight: about 80,000) | 24 |
| Conductive carbon black (average particle size: 30 mμ) | 3 |
| Myristic acid | 4 |
| Silicone oil (dimethylpolysiloxane; polymerization degree: 60) | 0.3 |
| Methyl ethyl ketone | 500 |
| Cyclohexanone | 200 |

The above-described composition was placed in a ball mill and dispersed for 24 hours, followed by filtering through a filter of 3 μm in average pore size to obtain magnetic coating material A.

| Magnetic Coating Material B | parts |
|---|---|
| Co-containing Berthollide iron oxide (Co content: 1.5 atomic %; FeO: 1.4; Hc: 580 Oe; average particle length: 0.6 μm; axial ratio: 10/1) | 300 |
| Vinyl chloride/vinyl acetate/vinyl alcohol copolymer (same as used for magnetic coating material A) | 40 |
| Polyester polyurethane (same as used for magnetic coating material A) | 24 |
| Conductive carbon black (average particle size: 30 mμ) | 3 |
| Oleic acid | 6 |
| Silicone oil (dimethylpolysiloxane; polymerization degree: 60) | 0.3 |
| Methyl ethyl ketone | 500 |

-continued

| Magnetic Coating Material B | parts |
|---|---|
| Cyclohexanone | 200 |

The above-described composition was placed in a ball mill, and dispersed for 24 hours. Then, 20 parts of Desmodur L-75 (adduct of 3 mols of tolylenediisocyanate and 1 mol of trimethylolpropane; 75 wt% ethyl acetate solution; made by Bayer A. G.), and subjected to high speed sheering dispersion for 1 hour, followed by filtering through a filter of 3 μm in average pore size to obtain magnetic coating material B.

| Magnetic Coating Material C | parts |
|---|---|
| Fe—Co—Cr alloy dust (Fe:Co:Cr = 70:29:1; average particle size: 300 A; average chain number: 10-15; Hc: 900 Oe) | 300 |
| Vinyl chloride/vinyl acetate/vinyl alcohol copolymer (same as used for magnetic coating material A) | 18 |
| Polyester polyurethane (same as used for magnetic coating material A) | 15 |
| Oleic acid | 6 |
| Amyl stearate | 1 |
| Silicone oil (dimethylpolysiloxane; polymerization degree: 60) | 0.6 |
| Methyl ethyl ketone | 500 |
| Cyclohexanone | 200 |

The above-described composition was placed in a ball mill, and dispersed for 24 hours. Then, 20 parts of Desmodur L-75 (same as used for magnetic coating material B) was added thereto and subjected to high speed sheering dispersion for 1 hour, followed by filtering through a filter of 1 μm in average pore size to obtain magnetic coating material C.

As the support, 3 μm thick p-phenyleneterephthalamide resin (hereinafter abbreviated as PTA) film and PET film (for comparison) were used. As to undercoating, a 1% methanol solution of 6,6/6,bis(4-aminocyclohexyl)methane-6-nylon (made by BASF A. G.; Ultramide 1C) (undercoating A), and a 1% methanol solution of N-alkoxymethyl-modified 6/6-nylon (Synthesis Example 2) prepared by modifying 6/6-nylon with formalin and methanol (undercoating B) were coated in a dry thickness of 0.1 μm, then dried.

Each of magnetic coating materials A, B and C was coated in a dry thickness of 3 μm on the support and, before the coating was not completely dried, subjected to orientation by applying outer magnetic field of 1,000 Oe, and dried. After drying, they were surface-treated using super-calender rolls under the conditions of 50 kg/cm$^2$ in pressure and 50° C. in temperature, then slit into 3.81 mm wide strips to prepare magnetic tapes. Each of the thus obtained magnetic tapes was stored under thermo-treatment condition at 50° C. (25% RH to 30% RH) to conduct sufficient aging.

Supports, undercoatings, kinds of magnetic coating materials, and resulting data of the samples 1-6 and comparison samples C-1 to C-8 are tabulated in the following Table 1.

TABLE 1

| Sample No. | Support (3 μm thick) | Under-Coating Layer (0.1 μm thick) | Magnetic Coating Material (3 μm thick) | Adhesion[1] (g) | Dropout[2] (dB) | Level Reduction[3] (dB) | Running Property[4] |
|---|---|---|---|---|---|---|---|
| 1 | APA | A | A | >100 | 0 | >−0.3 | good |
| 2 | APA | B | A | >100 | 0 | >−0.3 | good |
| C-1 | APA | — | A | 32 | −5 | −0.5~−3 | good |
| C-2 | PET | — | A | 51 | −5 | <−3 | bad |
| 3 | APA | A | B | >100 | 0 | >−0.3 | good |
| 4 | APA | B | B | >100 | 0 | >−0.3 | good |
| C-3 | APA | — | B | 18 | −5 | −0.5~−3 | good |
| C-4 | PET | —B | 37 | −5 | <−3 | bad |
| 5 | APA | A | C | >100 | 0 | >−0.3 | good |
| 6 | APA | B | C | >100 | 0 | >−0.3 | good |
| C-5 | APA | — | C | 2 | −10 | <−3 | good |
| C-6 | PET | A | C | 16 | −5 | <−3 | bad |
| C-7 | PET | B | C | 29 | −5 | <−3 | bad |
| C-8 | PET | — | C | 5 | −10 | <−3 | bad |

[1]Adhesion: Tension (g) at which Scotch No. 41 splicing tape (made by Sumitomo 3M Co.) applied to the magnetic recording layer of the obtained magnetic tape delaminates the magnetic recording layer from the base support or breaks the magnetic tape when drawn in a 180°direction.
[2]Dropout: 100 m of the obtained tape was loaded in a compact cassette half of Philips model and 1 KHz signal was recorded thereon using a cassette deck (TC-K7, made by SONY Corp.). After repeating regeneration 10 times back and forth, output reduction (dB) within 10 seconds was measured on a level recorder ("RION" LR-0.4 made by Kobayashi Rika Kikai Co., Ltd.), which was taken as dropout.
[3]Level Reduction: Output reduction of 3 dB or more upon dropout measurement for measuring longer than 10 seconds was taken as level reduction (dB).
[4]Running Property: After remeasuring dropout, the winding state and deformed degree of the magnetic tape were observed. Samples which were wound properly without unevenness of the tape edge face and underwent no deformation of one edge stretching as viewed through the aperture of the half were rated as the running property being good, whereas those which caused irregular winding of tape edge face or one edge stretching were rated as the running property being bad.

Table 1 shows the following facts. Comparison of sample Nos. 1 to 6, C-1, C-3 and C-5 reveals that aromatic polyamide suffered slight level reduction due to low adhesion between the magnetic recording layer and the support, though running property was good even without undercoating. Also, it was shown that magnetic recording material C suffered dropout so much due to scarce adhesion when undercoating was not conducted that it could not be practically usable.

Comparison of sample Nos. C-1 to C-6 reveals that PET support shows higher adhesion than the aromatic polyamide support even when no undercoating was conducted. However, PET showed an extremely poor running property and many samples thereof could not be allowed to run 10 times back and forth and were stopped on the way.

Comparison of sample Nos. C-6 to C-8 reveals that, when the alcohol-soluble polyamide resin of the present invention was undercoated on PET support, adhesion was improved as compared with the undercoating-free cases, but that sample Nos. 1 to 6 of APA support of the present invention showed more improved adhesion.

When magnetic recording layers of sample Nos. 2 and 5 were wiped using gauze wet with methanol, serious delamination was not observed, which may be attributed to the complete setting of the magnetic recording layer.

Then, when magnetic tape pieces were dipped in methanol, magnetic recording layer of sample No. 2 was delaminated due to dissolution of the undercoating layer, whereas sample No. 5 was not delaminated.

This may be attributed to cross-linking reaction of the N-alkoxymethyl-modified nylon during the thermal treatment.

EXAMPLE 2

As the undercoating, a 1% ethanol solution of 6,6/6,6/10-nylon terpolymer (Synthesis Example 1) (undercoating C) was used, and cassette tapes were obtained in the same manner as with sample Nos. 1 to 6 in Example 1.

As a result of measurements, respective properties were confirmed to be good.

From the above description, it was demonstrated that magnetic recording materials enabling high density recording per volume without dropout and level reduction were obtained only by providing the alcohol-soluble polyamide resin undercoating layer of the present invention on the aromatic polyamide support. Also, it was demonstrated that particularly remarkable undercoating effects of the present invention were obtained with respect to the magnetic recording layer wherein an isocyanate hardener was used as part of a binder as in coating solutions B and C.

It was further demonstrated that N-alkoxymethyl-modified nylon was preferable because it was rendered alcoholinsoluble by the thermo-treatment.

While the invention has been described in detail and with reference to specific embodiments thereof, it will be apparent to one skilled in the art that various changes and modifications can be made therein without departing from the spirit and scope thereof.

What is claimed is:

1. A magnetic recording material comprising a non-magnetizable flexible support of an aromatic polyamide resin having provided thereon a magnetic recording layer containing a ferromagnetic fine powder dispersed in a binder, and between said support and said magnetic recording layer an alcoholsoluble polyamide resin layer, wherein said aromatic polyamide resin is a polyamide resin represented by the formulae (I) or (II):

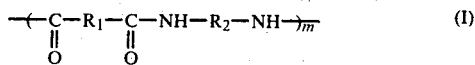

(I)

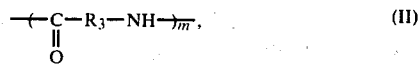

(II)

wherein $R_1$, $R_2$ and $R_3$ each represents

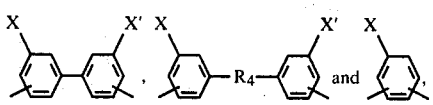

$R_4$ represents $$-O-, -\underset{\underset{O}{\|}}{C}-, -CH_2-$$

and $-S_2-$, X and X' which may be the same or different each represents a hydrogen atom, a halogen atom and nitro group, and m and m' each is an integer of from about 100 to about 1,000, provided that the polyamide resin contains at least 70% p-arylene groups based on the total number of arylene groups in the resin; or a polyamide resin containing units of both the formulae (I) and (II) in a molar ratio of (I) to (II) of from about 1:9 to about 9:1.

2. The magnetic recording material of claim 1, wherein said aromatic polyamide resin contains at least 70% based on the total number of arylene units in the resin of one or more of a unit selected from the group consisting of terephthalhydrazide unit, p-benzamide unit and p-phenyleneterephthalamide unit.

3. The magnetic recording material of claim 2, wherein said aromatic polyamide resin has a weight average molecular weight of from about 10,000 to 100,000.

4. The magnetic recording material of claim 1, wherein said support is about 3 to 10 μm thick.

5. The magnetic recording material of claim 4, wherein the surface roughness of said support is not more than about 0.1 μm.

6. The magnetic recording material of claim 1, wherein the alcohol-soluble polyamide resin is a nylon copolymer or an N-alkoxymethyl-modified nylon.

7. The magnetic recording material of claim 6, wherein said nylon copolymer is a terpolymer of 6-nylon, 6/6-nylon and 6/10-nylon or a terpolymer of 6-nylon, 6/6-nylon and bis(4-aminocyclohexyl)methane-6-nylon.

8. The magnetic recording material of claim 6, wherein said N-alkoxymethyl-modified nylon has the molecular structure represented by the formula (VIII):

(VIII)

wherein $R_9$ represents a hydrogen atom and an alkyl group having from 1 to 5 carbon atoms, p is an integer of from about 1 to 50.

9. The magnetic recording material of claim 1, wherein said alcohol-soluble polyamide resin layer is about 0.03 to 0.3 μm thick.

10. The magnetic recording material of claim 9, wherein said alcohol-soluble polyamide resin layer is about 0.05 to 0.2 μm thick.

11. The magnetic recording material of claim 1, wherein said alcohol-soluble polyamide resin layer is provided using a solvent of an alcohol having 1 to 5 carbon atoms.

12. The magnetic recording material of claim 11, wherein said solvent is at least one selected from the group consisting of methanol, ethanol, isopropanol, butanol and pentanol.

13. The magnetic recording material of claims 11 or 12, wherein said solvent contains 0 to about 50 wt% of a chlorine-series solvent based on the total weight of said solvent.

14. The magnetic recording material of claim 13, wherein said chlorine-series solvent is chloroform, trichloroethylene or ethylene dichloride.

15. The magnetic recording material of claim 1, wherein said magnetic recording layer is from about 0.8 to 10 μm thick.

16. The magnetic recording material of claim 15, wherein said magnetic recording layer is from 1 to 5 μm thick.

17. The magnetic recording material of claim 1, wherein the surface of said support opposite said magnetic recording layer is provided with a back-coating layer capable of preventing electrostatic charge, preventing transfer, preventing flutter, improving the strength of the magnetic recording material, or a matting.

18. The magnetic recording material of claim 17, wherein an alcohol-soluble polyamide resin layer is provided between said support and said back-coating layer.

19. the magnetic recording material of claim 18, wherein the alcohol-soluble polyamide resin is a nylon copolymer or an N-alkoxymethyl-modified nylon.

20. The magnetic recording material of claim 19, wherein said nylon copolymer is a terpolymer of 6-nylon, 6/6-nylon and 6/10-nylon, or a terpolymer of 6-nylon, 6/6-nylon and bis(4-aminocyclohexyl)methane-6-nylon.

21. The magnetic recording material of claim 19, wherein said N-alkoxymethyl-modified nylon has the molecular structure represented by the formula (VIII):

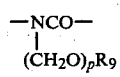

wherein R₉ represents hydrogen atom or alkyl group having from 1 to 5 carbon atoms, p is an integer of from about 1 to 50.

22. The magnetic recording material of claim 18, wherein said alcohol-soluble polyamide resin layer is about 0.03 to 0.3 μm thick.

23. The magnetic recording material of claim 22, wherein said alcohol-soluble polyamide resin layer is about 0.05 to 0.2 μm thick.

24. The magnetic recording material of claim 18, wherein said alcohol-soluble polyamide resin layer is provided using to a solvent of an alcohol having 1 to 5 carbon atoms.

25. The magnetic recording material of claim 24, wherein said solvent is at least one selected from the group consisting of methanol, ethanol, isopropanol, butanol and pentanol.

26. The magnetic recording material of claims 24 or 25, wherein said solvent contains 0 to about 50 wt% of a chlorine-series solvent based on the total weight of said solvent.

27. The magnetic recording material of claim 17, wherein said back-coating layer comprises thermosetting resins or reaction-type resins and inorganic or organic additives.

28. The magnetic recording material of claim 27, wherein said additive is carbon black, graphite, talc, $Cr_2O_3$, $\alpha$—$Fe_2O_3$ or silicone oil.

29. The magnetic recording material of claim 27, wherein the amount of said inorganic additives is about 30 to 85 wt%, and the amount of said organic additives is about 0.1 to 30 wt%, based on the total solid ingredients of the back-coating layer.

30. The magnetic recording material of claim 17, wherein said back-coating layer is about 0.5 to 3 μm thick.

31. The magnetic recording material of claims 1 or 17, wherein said magnetic recording material is an audio cassette tape or a video cassette tape.

32. The magnetic recording material of claim 1, wherein said alcohol-soluble polyamide resin layer increases adhesion between the aromatic polyamide support and the magnetic recording layer.

33. The magnetic recording material of claim 32, wherein said binder is an organic polymer.

34. The magnetic recording material of claim 33, wherein the ratio of the ferromagnetic powder to binder in the magnetic recording layer is about 8 to 400 parts by weight of the binder per 100 parts by weight of the ferromagnetic powder.

35. The magnetic recording material of claim 33, wherein the ratio of the ferromagnetic powder to binder in the magnetic recording layer is about 10 to 20 parts by weight of the binder per 100 parts by weight of the ferromagnetic powder.

36. The magnetic recording material of claim 34, wherein the binder is selected from the group consisting of thermoplastic resins, thermosetting resins and reaction resins.

37. The magnetic recording material of claim 36, wherein said binder is said thermoplastic resin and said thermoplastic resin has a sotening point of not higher than 150° C., a mean molecular weight of 10,000 to 200,000 and a polymerization degree of about 200 to 2,000.

38. The magnetic recording material of claim 36, wherein said binder is said thermosetting resin or said reaction resin and said binder has a molecular weight of not more than 200,000 in solution.

39. The magnetic recording material of claim 1, wherein said alcohol-soluble polyamide resin layer is the only layer present between said magnetic recording layer and said support.

40. The magnetic recording material of claim 1, wherein said aromatic polyamide resin contains at least 70% based on the total number of arylene units in the resin of one or more of a unit selected from the group consisting of terephthalhydrazide unit, p-benzamide unit and p-phenyleneterephthalamide unit, and wherein the alcohol-soluble polyamide resin is a terpolymer of 6-nylon, 6/6-nylon and 6/10-nylon or a terpolymer of 6-nylon, 6/6-nylon and bis(4-aminocyclohexyl)methane-6-nylon.

41. The magnetic recording material of claim 1, wherein said aromatic polyamide resin contains at least 70%, based on the total number of arylene units in the resin, of p-phenyleneterephthalamide units, and wherein the alcohol-soluble polyamide resin is an N-alkoxymethyl-modified nylon prepared by reacting nylon with formalin and nylon and having the molecular structure represented by formula (VIII):

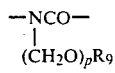

wherein $R_9$ represents a hydrogen atom or an alkyl group having 1 to 5 carbon atoms and p is an integer of about 1 to 50, the modification degree of the nylon being more than 20% based on the total number of repeating units in the nylon, said support having a thickness of about 2 to 80 μm and said alcohol-soluble polyamide resin layer having a dry thickness of about 0.03 to 0.3 μm.

42. The magnetic recording material of claim 41, wherein said support has a thickness of about 3 to 10 μm and said alcohol-soluble polyamide resin layer has a dry thickness of about 0.05 to 0.2 μm.

43. The magnetic recording material of claim 41 or claim 42, wherein said nylon is 6/6 nylon.

* * * * *